United States Patent
Katayama et al.

(10) Patent No.: US 9,718,333 B2
(45) Date of Patent: Aug. 1, 2017

(54) WATER DISCHARGE STRUCTURE FOR SUNROOF DEVICE

(71) Applicant: Yachiyo Industry Co., Ltd., Sayama-shi, Saitama (JP)

(72) Inventors: Hajime Katayama, Tochigi (JP); Kanehiro Otani, Tochigi (JP)

(73) Assignee: YACHIYO INDUSTRY CO., LTD., Sayama-shi (JP)

( * ) Notice: Subject to any disclaimer, the term of this patent is extended or adjusted under 35 U.S.C. 154(b) by 0 days.

(21) Appl. No.: 14/914,368

(22) PCT Filed: Mar. 12, 2015

(86) PCT No.: PCT/JP2015/057351
§ 371 (c)(1),
(2) Date: Feb. 25, 2016

(87) PCT Pub. No.: WO2015/178071
PCT Pub. Date: Nov. 26, 2015

(65) Prior Publication Data
US 2016/0207380 A1 Jul. 21, 2016

(30) Foreign Application Priority Data
May 21, 2014 (JP) .................................. 2014-104929

(51) Int. Cl.
*B60J 7/00* (2006.01)
*B60J 10/82* (2016.01)

(52) U.S. Cl.
CPC ............. *B60J 7/0084* (2013.01); *B60J 10/82* (2016.02)

(58) Field of Classification Search
CPC .................................................... B60J 7/0084
(Continued)

(56) References Cited

U.S. PATENT DOCUMENTS

| 4,368,915 A * | 1/1983 | Torii | B60J 7/022 |
| | | | 285/189 |
| 4,811,985 A * | 3/1989 | Kruger | B60J 7/003 |
| | | | 296/214 |

(Continued)

FOREIGN PATENT DOCUMENTS

| JP | 56-24319 | 3/1981 |
| JP | 60-175720 | 11/1985 |
| JP | 2004-114928 | 4/2004 |

OTHER PUBLICATIONS

International Search Report dated Jun. 9, 2015, Application No. PCT/JP2015/057351.

*Primary Examiner* — Dennis H Pedder
(74) *Attorney, Agent, or Firm* — Rankin, Hill & Clark LLP (57) ABSTRACT

Provided is a water discharge structure for a sunroof device, the water discharge structure being capable of suitably preventing rainwater, etc. from penetrating a stationary roof. A water discharge structure for a sunroof device is configured so as to comprise: a panel body for closing an opening formed in the stationary roof of a vehicle; frame members arranged along edges of the stationary roof and provided with water discharge grooves; brackets mounted to the frame members and supporting the panel body; and water discharge guide plates disposed between the panel body and the brackets and conducting rainwater etc., which have entered along the seal surfaces between the panel body and the edges of the stationary roof, to the water discharge grooves.

6 Claims, 7 Drawing Sheets

(58) Field of Classification Search
USPC .......... 296/213 O, 213, 216.06–216.09, 215, 296/216.01
See application file for complete search history.

(56) References Cited

U.S. PATENT DOCUMENTS

| | | | | |
|---|---|---|---|---|
| 4,844,532 A | * | 7/1989 | Ono | ........................ B60J 7/043 296/208 |
| 2015/0306941 A1 | * | 10/2015 | Dayoub | .................. B60J 7/047 296/213 |

* cited by examiner

WATER DISCHARGE STRUCTURE FOR SUNROOF DEVICE

TECHNICAL FIELD

The present invention relates to a water-drainage structure in a sunroof device.

BACKGROUND ART

For example, the structure disclosed in Patent Literature 1 is conventionally known as a sunroof device. The sunroof device disclosed in Patent Literature 1 includes, as main constituents, an opening, a pair of side frames, and a panel body. The opening is arranged in a fixed roof of a vehicle, the pair of side frames are arranged along edges of the fixed roof, and the panel body is arranged to cover the opening. For example, a water-drainage structure as illustrated in FIG. 7A is known as a water-drainage structure which can be used in the above sunroof device.

Figure 7A:
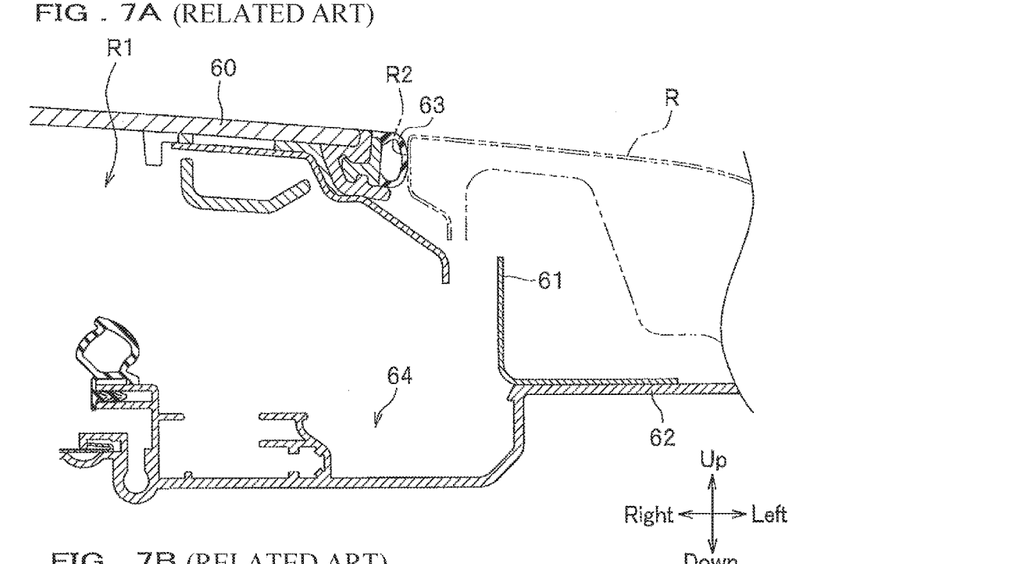
FIG. 7A is a cross-sectional view of essential portions.

In the water-drainage structure illustrated in FIG. 7A, the bracket 61 for supporting the panel body 60 is attached to each side frame 62. The panel body 60 is arranged at the opening R1 in the fixed roof via the bracket 61, and is in close contact with the edge R2 of the fixed roof R via the sealing member 63.

The drain groove 64, which extends in the front-rear direction of the vehicle, is arranged integrally with the side frame 62. The drain groove 64 is arranged below the edge R2 of the fixed roof R, and performs the function of receiving and draining rainwater or the like when the rainwater or the like intrudes through the sealing interface between the sealing member 63 and the edge R2.

CITATION LIST

Patent Literature

Patent Literature 1: Japanese Patent Laid-open No. 2004-114928

SUMMARY OF INVENTION

Technical Problem

Figure 7B:
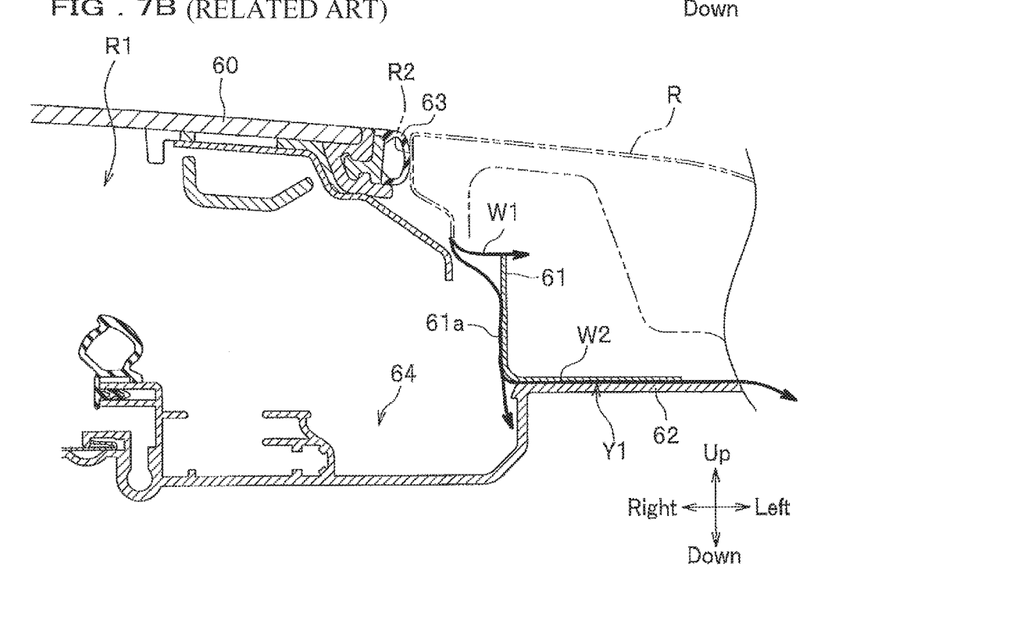
FIG. 7B is a cross-sectional view of the essential portions illustrating drainage when rainwater or the like intrudes.

However, in the above water-drainage structure of the sunroof device, as illustrated in FIG. 7B, rainwater or the like W1 can intrude from the opening R1 side over the upper edge of the bracket 61 into the fixed roof R side when the rainwater or the like W1 intrudes along the sealing interface between the sealing member 63 of the panel body 60 and the edge R2 of the fixed roof R. In addition, the rainwater or the like W2 which flows along a side face 61a of the bracket 61 can intrude along the interface Y1 between the side frame 62 and the bracket 61 (permeate through the interface Y1) from the opening R1 side into the fixed roof R side The present invention has been created for solving the above problems, and the object of the present invention is to provide a water-drainage structure in a sunroof device which can desirably prevent intrusion of rainwater or the like from the opening side into the fixed roof side of the bracket.

Solution to Problem

In order to solve the aforementioned problem, the present invention is characterized in including: a panel body which closes an opening formed in a fixed roof of a vehicle; a frame being arranged along an edge of the fixed roof and including a drainage groove; a bracket being arranged vertically under the fixed roof and attached to the frame, and supporting the panel body; and a drainage-guide plate being arranged vertically under the fixed roof and interposed between the panel body and the bracket, and guiding, to the drainage groove, rainwater or the like which intrudes along a sealing interface between the panel body and the edge of the fixed roof.

According to the above structure, the provision of the drainage-guide plate enables desirable guiding, to the drainage groove, of rainwater or the like which intrudes along the sealing interface between the panel body and the edge of the fixed roof.

In addition, it is preferable that the lower edge of the drainage-guide plate be located at a lower elevation than the interface between the frame and the bracket.

According to the above structure, intrusion of the rainwater or the like from the opening side along the interface between the frame and the bracket to the fixed roof side can be prevented with high reliability.

Further, it is preferable that the upper edge of the drainage-guide plate be located at a higher elevation than the upper edge of the bracket.

According to the above structure, intrusion of the rainwater or the like from the opening side over the upper edge of the bracket to the fixed roof side can be prevented with high reliability.

Furthermore, it is preferable that a holder which is firmly fixed to the panel body and a holder extension which is arranged at the leading edge of the holder be provided, and the holder extension, the drainage-guide plate, and the bracket be fastened together with a fastening member.

According to the above structure, it is possible to interpose the drainage-guide plate between the panel body and the bracket with a simple structure.

Moreover, it is preferable that a panel-support member having an approximately hat-like cross-sectional shape be interposed between the holder extension and the drainage-guide plate, and the panel body be supported apart from the drainage-guide plate by the panel-support member.

According to the above structure, flow, to the drainage-guide plate side (the bracket side), of the rainwater or the like which has flowed along the holder extension can be suppressed.

Further, it is preferable that a cover portion which covers at least a portion of the fastening member be arranged in the panel-support member.

According to the above structure, the cover portion can prevent the fastening member from getting wet with rainwater or the like. Therefore, deterioration of the fastening member can be desirably suppressed.

Advantageous Effect of Invention

The water-drainage structure in a sunroof device according to the present invention can desirably prevent intrusion of rain water and the like from the opening side into the fixed roof side of the bracket.

BRIEF DESCRIPTION OF THE DRAWINGS

FIGS. 7A and 7B illustrate a conventional technique, where

DESCRIPTION OF EMBODIMENT

Hereinbelow, an embodiment of a sunroof device to which a water-drainage structure for a sunroof device according to the present invention is applied is explained with reference to drawings. In the following explanations, the "front-rear", "right-left" and "up-down" are referred to based on the directions indicated in FIG. 1 and FIG. 2A. Although a water-drainage structure on the right or left side of the sunroof device is taken as an example in the present embodiment, it is not intended to limit the position in which the water-drainage structure according to the present invention is used.

Figure 1:
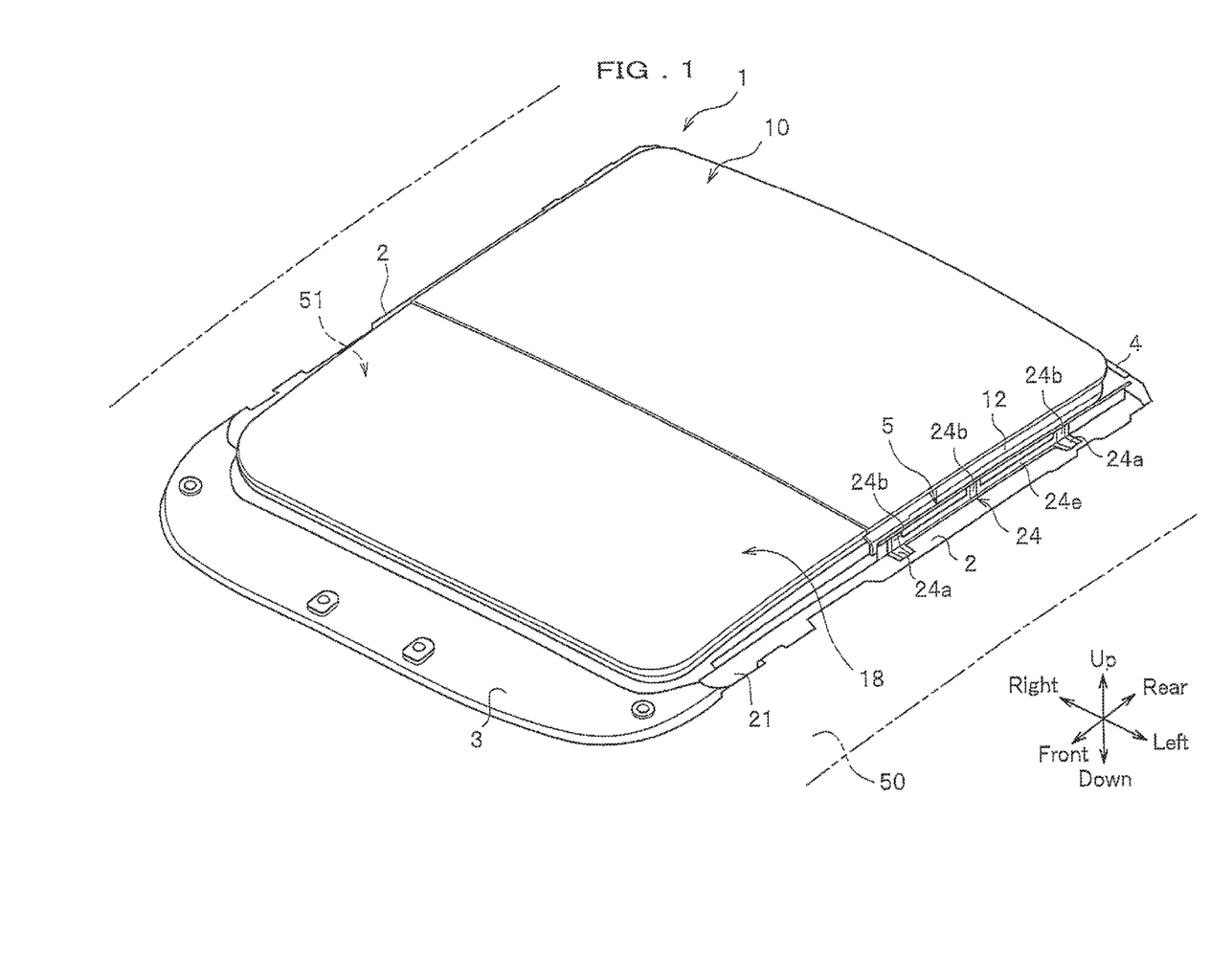
FIG. 1 is a perspective view illustrating an outline of a structure of a sunroof device to which a water-drainage structure for a sunroof device according to an embodiment of the present invention is applied.

In FIG. 1, the sunroof device 1 includes a fixed panel body 10 and an openable panel body 18, which are fitted on an opening 51 being formed in a fixed roof 50 of a car as a vehicle and having an approximately rectangular shape. For example, the openable panel body 18 can be slid toward the fixed panel body 10 (located on the rear side) when opening.

Figure 3:
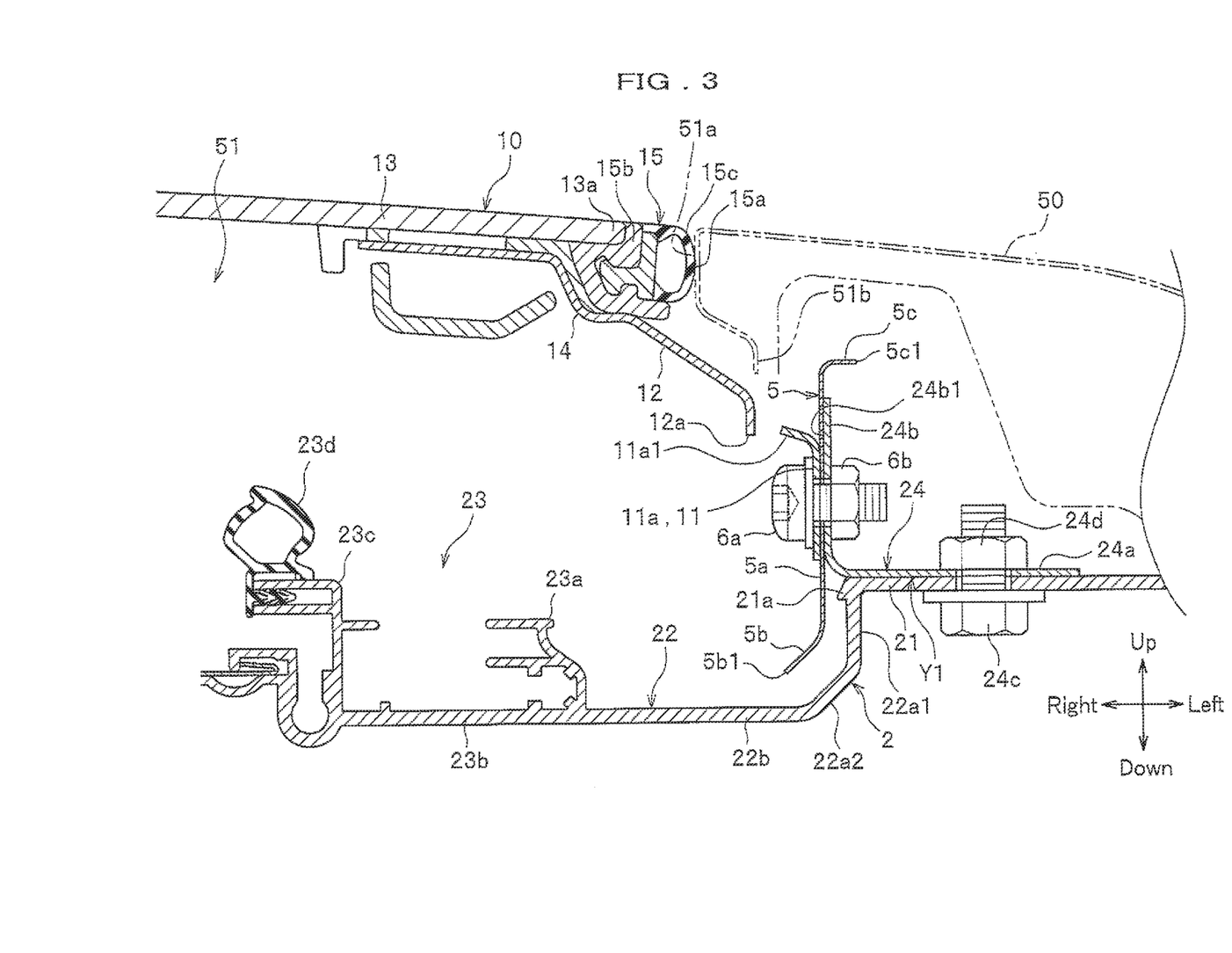
FIG. 3 is a magnified cross-sectional view at the line A-A indicated in FIG. 2B.

Right and left side frames 2, a front frame 3, and a rear frame 4 are arranged to form a frame below a periphery of the fixed roof 50 which defines the opening 51. The right and left side frames 2 extend in the front-rear direction along the right and left edge portions 51a (as illustrated in FIG. 3). The front frame 3 extends in the lateral direction along a front edge, and the rear frame 4 extends in the lateral direction along a rear edge. Since the right and left side frames 2 are bilaterally symmetric and have approximately identical structures, only the left side of the vehicle is explained below.

The left side frame 2 is formed of, for example, an aluminum alloy or the like, and has an approximately identical cross-sectional shape across the entire length. As illustrated in FIG. 3, the left side frame 2 includes a flange portion 21, a drainage groove 22, and a rail groove 23. The flange portion 21 is arranged inside the fixed roof 50, the drainage groove 22 extends in the opening 51 to continue to the flange portion 21, and the rail groove 23 is formed adjacent to the drainage groove 22.

Figure 2A:
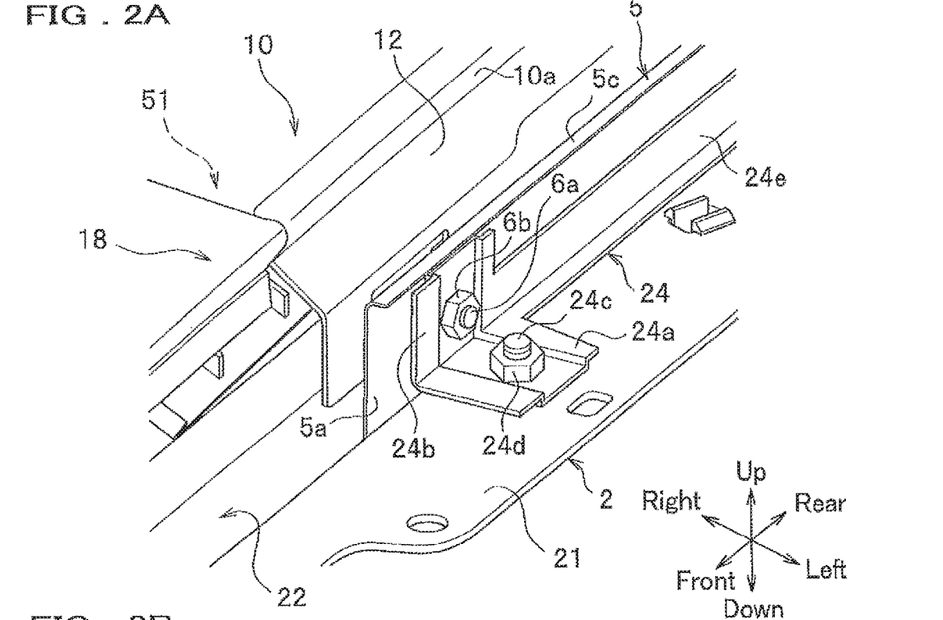
FIG. 2A is a partially magnified perspective view illustrating details of essential portions.
Figure 2B:
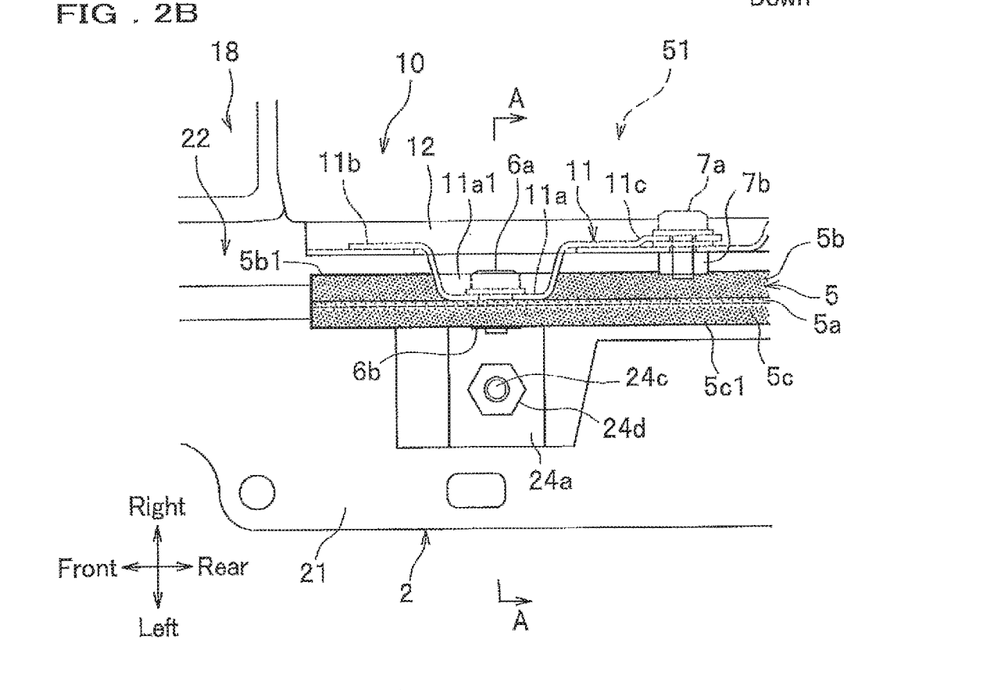
FIG. 2B is a partially magnified plan view illustrating details of the essential portions.

As illustrated in FIGS. 2A and 2B, the flange portion 21 has a plate-like shape. A bracket 24 for supporting the fixed panel body 10 is attached to the rear side of the upper face of the flange portion 21. As illustrated in FIG. 1, the bracket 24 extends in the front-rear direction along the left side frame 2, and includes a plate-like portion 24e, attaching portions 24a, and rising portions 24b. The attaching portions 24a and the rising portions 24b are arranged integrally with the plate-like portion 24e. As illustrated in FIG. 3, the bracket 24 has an approximately L shape in front view.

Figure 4:
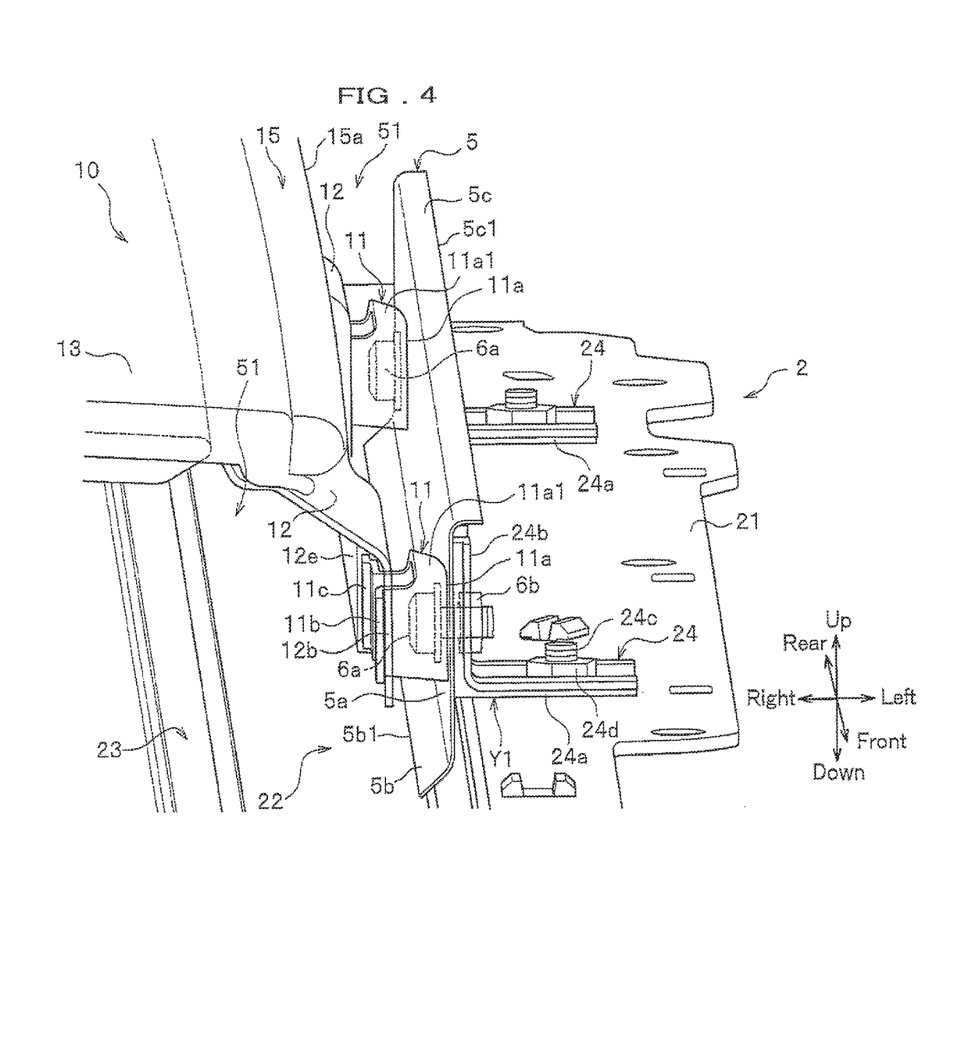
FIG. 4 is a perspective view, from the front side in a downward slanting direction, indicating relative positions of the bracket, a drainage-guide plate, and a panel-support member.

As illustrated in FIG. 1, the attaching portions 24a are arranged in two positions at the front and rear ends. As illustrated in FIG. 3, the attaching portions 24a are fixed to the flange portion 21 by screwing a nut 24d on an attaching bolt 24c, which is inserted through the flange portion 21 and each attaching portion 24a. As illustrated in FIG. 1, the rising portions 24b are arranged in three positions at the front end, the rear end, and the center in the front-rear direction. A panel-support member 11 (as illustrated in FIGS. 2A and 2B and FIG. 4) for supporting a drainage-guide plate 5 and the fixed panel body 10 is fixed to each rising portion 24b.

As illustrated in FIG. 3, the bracket 24 is fixed in such an offset position that the rising portions 24b protrude rightward from the right end corner 21a of the flange portion 21 (the upper left end of the drainage groove 22). Therefore, the drainage-guide plate 5, which is fixed to right side faces of the rising portions 24b, is arranged above the drainage groove 22.

The right end corner 21a of the flange portion 21 partially protrudes toward the inside of the drainage groove 22. Therefore, the rainwater or the like which flows in the drainage groove 22 cannot easily intrude into the interface Y1 between the flange portion 21 and the attaching portions 24a.

The drainage groove 22 extends in the front-rear direction along the edge portion 51a of the fixed roof 50, and has the function of draining the rainwater or the like which intrudes into the opening 51. As illustrated in FIG. 3, the drainage groove 22 is formed to have a cross section with an approximately U shape by being surrounded by a vertical wall 22a1, an inclined wall 22a2, a bottom wall 22b, and a left guide wall 23a. The inclined wall 22a2 and the vertical wall 22a1 continue to the right end corner 21a of the flange portion 21. The bottom wall 22b continues to the inclined wall 22a2. The left guide wall 23a constitutes the rail groove 23. The drainage groove 22 is arranged below the edge portion 51a of the fixed roof 50 (below an edge portion 15a of the fixed panel body 10) in front view. The inclined wall 22a2 has an inclined face which is inclined toward the center of the drainage groove 22.

Drainage members (not shown) are arranged in front and rear portions of the drainage groove 22 such that the rainwater or the like which flows into the drainage groove 22 are drained through the drainage members to the outside of the vehicle.

The rail groove 23 is a groove supporting a side-edge portion (not shown) of the openable panel body 18 on each of the right and left sides in such a manner that the openable panel body 18 can freely move in the front-rear direction. The rail groove 23 is constituted by the left guide wall 23a, a bottom wall 23b, and a right guide wall 23c. A sealing member 23d, which is in close contact with the openable panel body 18, is attached on the upper face of the right guide wall 23c.

The drainage-guide plate 5 is a member being formed of metal and having an approximately plate-like shape. The drainage-guide plate 5 is approximately perpendicular to the flange portion 21, and extends in the front-rear direction along the bracket 24. The drainage-guide plate 5 has the function of guiding rainwater and the like to the drainage groove 22. As illustrated in FIG. 3, the drainage-guide plate 5 is interposed between the panel-support members 11 and the rising portions 24b of the bracket 24. The drainage-guide plate 5 is fixed to each rising portion 24b by screwing a nut 6b on a fixing bolt 6a, which is inserted through the panel-support member 11, the drainage-guide plate 5, and the rising portion 24b. That is, a holder extension 12, the drainage-guide plate 5, and the rising portions 24b (the bracket 24) are fastened together by the screwing the nut 6b on the fixing bolt 6a. The fixing bolt 6a and the nut 6b correspond to the "fastening member" in the appended claims.

The drainage-guide plate 5 includes a base portion 5a, a lower portion 5b, and an upper portion 5c. The lower portion 5b continues to a lower end of the base portion 5a, and the upper portion 5c continues to an upper end of the base portion 5a. As illustrated in FIG. 3, the base portion 5a is fixed to the rising portions 24b in such a manner that the base portion 5a covers an entire right side face 24b1 of each rising portion 24b (i.e., the entire side face of the bracket 24 illustrated in FIG. 2A). In the present embodiment, as illustrated in FIG. 3, the base portion 5a is located over a rightward extension of the interface Y1 (the abutting face), and therefore the base portion 5a covers the interface Y1. That is, the interface Y1 is hidden by the base portion 5a.

The lower portion 5b is inclined toward the opening 51 from the lower end of the base portion 5a, and has a function of guiding the rainwater and the like to the center, in the lateral direction, of the drainage groove 22. The lower portion 5b is located at a lower elevation than the interface Y1, and the lower edge 5b1 of the lower portion 5b is close to the bottom wall 22b of the drainage groove 22. The upper portion 5c is formed, by bending, to extend from the upper end of the base portion 5a toward the side opposite to the opening 51 (the flange portion 21 side or the fixed roof 50 side). The upper portion 5c is located at a higher elevation than the upper edges of the rising portions 24b of the bracket 24, and covers the rising portions 24b from the upper side. In addition, as illustrated in FIG. 3, the upper portion 5c is located on the upper left side of the lower edge of a lower end portion 51b. The drainage-guide plate 5 can be formed of, for example, synthetic resin.

Figure 5:
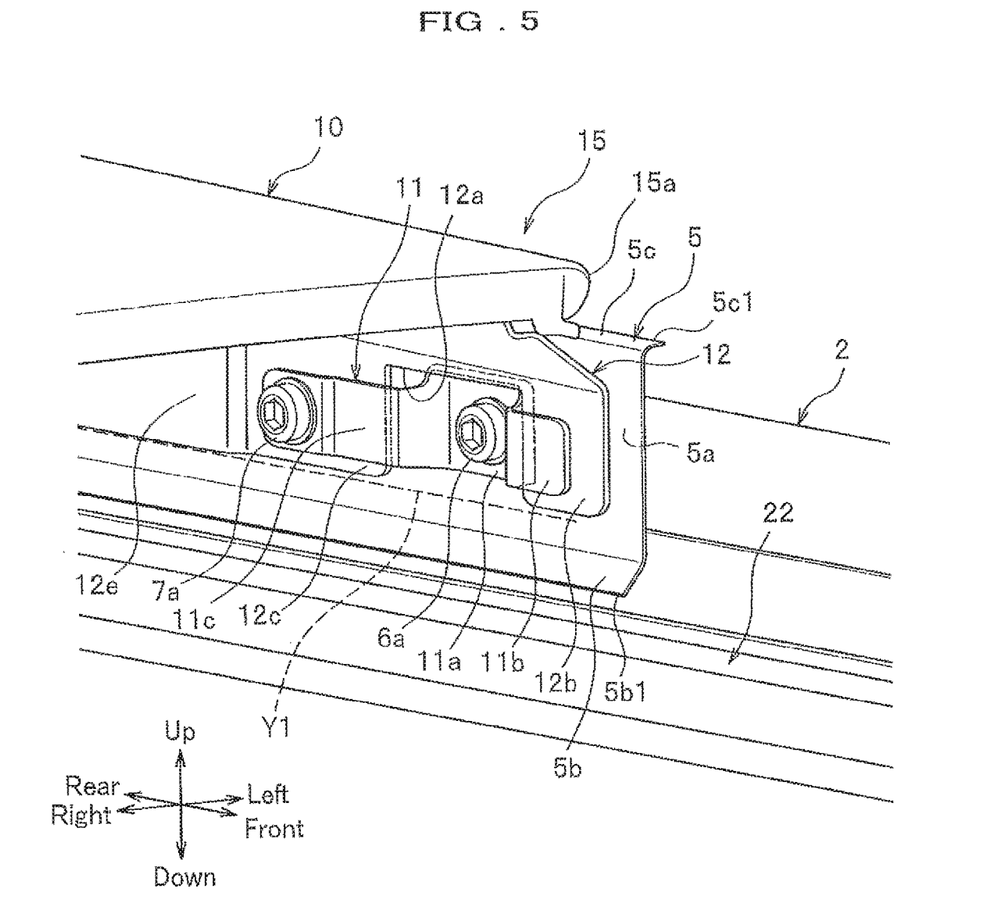
FIG. 5 is a magnified perspective view, from the opening side, of a situation of fixing with the panel-support member.

As illustrated in FIG. 2B, the panel-support member 11 for the fixed panel body 10 has an approximately hat-like shape in a plan view, and the central portion of the panel-support member 11 is swelled out toward the drainage-guide plate 5 from the holder extension 12. The panel-support member 11 includes a fixed support portion 11a, a front flange portion 11b, and a rear flange portion 11c. The front flange portion 11b continues to the front end of the fixed support portion 11a, and the rear flange portion 11c continues to the rear end of the fixed support portion 11a. As explained before, the fixed support portion 11a is fixed to the rising portions 24b by screwing the nut 6b on the fixing bolt 6a to hold the fixed support portion 11a and each rising portion 24b together. As illustrated in FIG. 5, a cutout portion 12a, which is formed in a downwardly-extended portion 12e of the holder extension 12 of the fixed panel body 10, is engaged with the fixed support portion 11a. The front flange portion 11b is arranged on a right side face of the downwardly-extended portion 12e through the cutout portion 12a and abuts a portion 12b on the front-edge side of the cutout portion 12a. Similarly, the rear flange portion 11c passes through the cutout portion 12a and is arranged on the right side face of the downwardly-extended portion 12e through the cutout portion 12a and abuts a portion 12c on the rear-edge side of the cutout portion 12a. The rear flange portion 11c is fixed to the portion 12c by screwing a nut 7b on a bolt 7a. The fixed panel body 10 is supported apart from the drainage-guide plate 5 with the panel-support member 11 as above.

As illustrated in FIG. 4, a cover portion 11a1 is integrally formed in an upper portion of the fixed support portion 11a. The cover portion 11a1 covers the head of the fixing bolt 6a from the upper side. Therefore, rainwater or the like which intrudes along the sealing interface as explained later is unlikely to fall on the fixing bolt 6a.

As illustrated in FIG. 3, the fixed panel body 10 is constituted by a sunroof panel 13, a holder 14, and a sealing member 15. The sunroof panel 13 is formed of glass, hard resin such as acrylic resin or polycarbonate resin, a steel plate, or the like. The holder 14 is attached along the periphery of the lower face of the sunroof panel 13.

The holder 14 is manufactured by press forming of a metallic plate, and functions as a reinforcing member (reinforcing frame) for the sunroof panel 13. The holder extension 12 is integrally arranged at the leading edge of the holder 14. The holder 14 is firmly fixed to the lower face of the sunroof panel 13.

The sealing member 15 is attached to the periphery 13a of the sunroof panel 13 through the support member 15b. The sealing member 15 seals between the edge portion 51a of the fixed roof 50 and the sunroof panel 13. The sealing member 15 is arranged in close contact with the edge portion 51a of the fixed roof 50 to prevent intrusion of the rainwater or the like.

The sealing member 15 is provided in the leading edge with an abutting portion 15c which is formed to have a hollow such that the sealing member 15 relatively easily collapses. The sealing member 15 is formed of a material having elasticity, for example, ethylene propylene rubber (EPDM) or the like, and has a uniform cross-sectional shape.

The openable panel body 18 is arranged to be movable in the front-rear direction by use of the aforementioned rail groove 23, and can be housed below the fixed panel body 10 (located on the rear side) when opened. Alternatively, the openable panel body 18 may be constituted by multiple panels. Further alternatively, the openable panel body 18 may be configured to be located above the fixed panel body 10 when opened.

Figure 6:
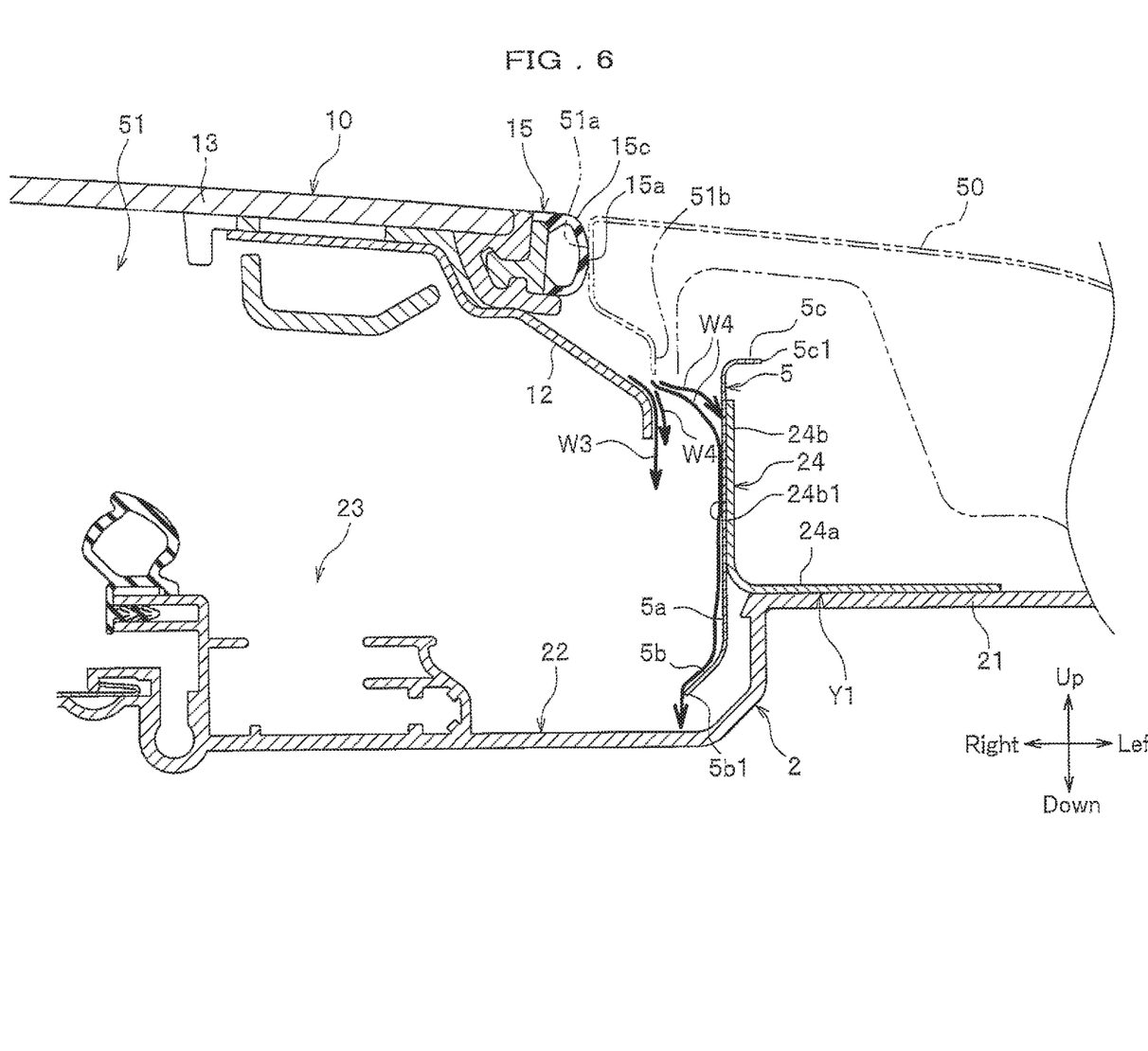
FIG. 6 is a diagram presented for explaining drainage when rainwater or the like intrudes.

Next, the function when rainwater or the like is assumed to intrude along the interface between the sealing member 15 in the fixed panel body 10 and the edge portion 51a of the fixed roof 50 is explained with reference to FIG. 6. In FIG. 6, some constituents including the attaching bolt 24c are not shown for convenience of explanation. As illustrated in FIG. 6, when rainwater or the like intrudes along the interface (sealing member) between the sealing member 15 and the edge portion 51a, a portion W3 of the rainwater or the like flows on the upper face of the holder extension 12, and drops down to the drainage groove 22.

In addition, a portion W4 of the rainwater or the like flows along the edge portion 51a of the fixed roof 50 and drops down to the drainage groove 22, or flows from the lower end portion 51b of the edge portion 51a toward the bracket 24. Since the drainage-guide plate 5 is attached to the right side face 24b1 of the rising portions 24b of the bracket 24, the portion W4 of the rainwater or the like which has flowed toward the bracket 24 then flows along the drainage-guide plate 5, and drops from the lower edge 5b1 of the lower portion 5b of the drainage-guide plate 5 down to the drainage groove 22.

In other words, the portion W4 of the rainwater or the like does not intrude from the opening 51 over the upper edge of the bracket 24 to the fixed roof 50 side. Instead, the portion W4 of the rainwater or the like flows on the right side face of the drainage-guide plate 5 and is desirably guided to the drainage groove 22. In addition, the portion W4 of the rainwater or the like is desirably guided to the drainage groove 22 without intruding the interface Y1 between the flange portion 21 and the attaching portions 24a.

In the water-drainage structure in the sunroof device according to the present embodiment as explained above, the provision of the drainage-guide plate 5 enables desirable guiding, to the drainage groove 22, of the portion W4 of the rainwater or the like which intrudes along the sealing interface between the fixed panel body 10 and the edge portion 51a of the fixed roof 50.

In addition, since the lower edge 5b1 (the lower portion 5b) of the drainage-guide plate 5 is located at a lower elevation than the interface Y1 between the flange portion 21 and the attaching portions 24a, intrusion of the rainwater or the like W4 from the opening 51 side along the interface Y1 to the fixed roof 50 side (on the lower side of the fixed roof 50 and the left side of the drainage-guide plate 5) can be prevented with high reliability.

Further, an upper edge 5c1 (the upper portion 5c) of the drainage-guide plate 5 is located at a higher elevation than the upper edge of the bracket 24 and the lower edge of the lower end portion 51b, intrusion of the rainwater or the like W4 from the opening 51 side over the upper edge of the bracket 24 to the fixed roof 50 side can be prevented with high reliability.

Furthermore, since the holder extension 12, the drainage-guide plate 5, and the rising portions 24b (the bracket 24) are fastened together by screwing the nut 6b on the fixing bolt 6a, the drainage-guide plate 5 can be interposed between the fixed panel body 10 and the bracket 24 with the simple structure.

Moreover, since the fixed panel body 10 is supported apart from the drainage-guide plate 5 by the panel-support member 11, flow, to the drainage-guide plate 5 side (the bracket 24 side), of the rainwater or the like which has flowed along the holder extension 12 can be suppressed.

In addition, since the cover portion 11a1 of the panel-support member 11 can prevent the head of the fixing bolt 6a from getting wet with rainwater or the like, deterioration of the fixing bolt 6a and the nut 6b can be desirably suppressed.

Although an embodiment of the present invention is explained as above, the present invention is not limited to the explained embodiment, and variations can be embodied, for example, as explained below.

For example, although the above embodiment is arranged such that the base portion 5a of the drainage-guide plate 5 covers the interface Y1 from a lateral side, the present invention is not limited to such an arrangement. As long as an arrangement is made such that the rainwater or the like which has flowed along the side face of the drainage-guide plate 5 does not flow toward the interface Y1, the interface Y1 may not be completely covered by the drainage-guide plate 5.

Further, although the upper portion 5c of the drainage-guide plate 5 is formed to be bent toward the inside of the fixed roof 50 in the illustrated embodiment, the present invention is not limited to such an embodiment. The drainage-guide plate 5 may have various shapes as long as the shape of the drainage-guide plate 5 is such that flow of rainwater or the like from the opening 51 side over the upper edge of the bracket 24 to the fixed roof 50 side is prevented.

LIST OF REFERENCE SIGNS

1: Sunroof Device
2: Side Frame (Frame)
5: Drainage-guide Plate
5b1: Lower Edge
5c1: Upper Edge
10: Panel Body
22: Drainage Groove
24: Bracket
50: Fixed Roof
51: Opening
51a: Edge Portion
Y1: Interface

The invention claimed is:

1. A water-drainage structure in a sunroof device, comprising:
a panel body which closes an opening formed in a fixed roof of a vehicle;
a frame being arranged along an edge of the fixed roof and including a drainage groove;
a bracket being arranged vertically under the fixed roof and attached to the frame, and supporting the panel body; and
a drainage-guide plate being arranged vertically under the fixed roof and interposed between the panel body and the bracket, and guiding, to the drainage groove, water which intrudes along a sealing interface between the panel body and the edge of the fixed roof,
wherein
the drainage-guide plate is attached to the bracket,
the drainage-guide plate is a separate body from each of the fixed roof, the panel body, the frame, and the bracket, and
an upper edge of the drainage-guide plate is located at a higher elevation than an upper edge of the bracket.

2. A water-drainage structure in a sunroof device, comprising:
a panel body which closes an opening formed in a fixed roof of a vehicle;
a frame being arranged along an edge of the fixed roof and including a drainage groove;
a bracket being arranged vertically under the fixed roof and attached to the frame, and supporting the panel body;
a drainage-guide plate being arranged vertically under the fixed roof and interposed between the panel body and the bracket, and guiding, to the drainage groove, water which intrudes along a sealing interface between the panel body and the edge of the fixed roof; and
a holder firmly fixed to the panel body, and a holder extension arranged at a leading edge of the holder, wherein the holder extension, the drainage-guide plate, and the bracket are fastened together with a fastening member,
wherein
the drainage-guide plate is attached to the bracket, and
the drainage-guide plate is a separate body from each of the fixed roof, the panel body, the frame, and the bracket.

3. The water-drainage structure in the sunroof device according to claim 2, wherein a panel-support member having an approximately hat-like shape in a plan view is interposed between the holder extension and the drainage-guide plate, and the panel body is supported apart from the drainage-guide plate by the panel-support member.

4. The water-drainage structure in the sunroof device according to claim 3, wherein a cover portion which covers at least a portion of the fastening member is arranged in the panel-support member.

5. The water-drainage structure in the sunroof device according to claim 1, wherein a lower edge of the drainage-guide plate is located at a lower elevation than an interface between the frame and the bracket.

6. The water-drainage structure in the sunroof device according to claim 2, wherein a lower edge of the drainage-guide plate is located at a lower elevation than an interface between the frame and the bracket.

* * * * *